(12) United States Patent
Natarajan et al.

(10) Patent No.: US 7,451,203 B2
(45) Date of Patent: Nov. 11, 2008

(54) METHOD AND SYSTEM FOR COMMUNICATING BETWEEN A MANAGEMENT STATION AND AT LEAST TWO NETWORKS HAVING DUPLICATE INTERNET PROTOCOL ADDRESSES

(75) Inventors: Srikanth Natarajan, Ft. Collins, CO (US); Dipankar Gupta, Ft. Collins, CO (US); Peter C. Zwetkof, Crealay, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 832 days.

(21) Appl. No.: 10/740,897

(22) Filed: Dec. 22, 2003

(65) Prior Publication Data

US 2005/0149633 A1 Jul. 7, 2005

(51) Int. Cl.
*G06F 15/173* (2006.01)
(52) U.S. Cl. .................. 709/223; 709/224; 709/238; 709/246
(58) Field of Classification Search ......... 709/223–224, 709/230, 238, 235, 249, 245, 246
See application file for complete search history.

(56) References Cited

U.S. PATENT DOCUMENTS

| | | | | |
|---|---|---|---|---|
| 6,041,349 A | * | 3/2000 | Sugauchi et al. | 709/223 |
| 6,425,008 B1 | * | 7/2002 | Lecheler et al. | 709/224 |
| 6,581,108 B1 | | 6/2003 | Denison et al. | |
| 6,671,739 B1 | * | 12/2003 | Reed | 709/238 |
| 6,763,235 B2 | * | 7/2004 | Imai | 455/443 |
| 6,895,429 B2 | * | 5/2005 | Banga et al. | 709/215 |
| 6,987,764 B2 | * | 1/2006 | Hsu | 370/390 |
| 7,047,314 B2 | * | 5/2006 | Sato et al. | 709/238 |
| 7,051,066 B1 | * | 5/2006 | Albert et al. | 709/232 |
| 7,139,823 B2 | * | 11/2006 | Benfield et al. | 709/224 |
| 7,200,649 B1 | * | 4/2007 | Batke et al. | 709/222 |
| 2002/0165934 A1 | | 11/2002 | Conrad et al. | |
| 2002/0165982 A1 | * | 11/2002 | Leichter et al. | 709/245 |

FOREIGN PATENT DOCUMENTS

| | | |
|---|---|---|
| EP | 1 251 657 | 10/2002 |
| EP | 1 251 657 A2 | 10/2002 |
| GB | 2 377 121 | 12/2002 |

OTHER PUBLICATIONS

Policy-Based Routing, White Paper, 1996, Cisco Systems, Inc. 7 pages.
UK Search Report dated Apr. 15, 2005 re GB 0427596.2.

* cited by examiner

*Primary Examiner*—Philip B Tran (57) ABSTRACT

A system and method for communicating between a management station and at least two networks having duplicate Internet Protocol (IP) addresses. An IP address for an IP data packet to be sent to at least one of an end device and the management station is recognized. A header of the IP data packet with a tag that identifies one of the duplicate IP networks within which the end device resides is modified. The IP data packet is routed, based on the tag, in accordance with a policy.

32 Claims, 5 Drawing Sheets

METHOD AND SYSTEM FOR COMMUNICATING BETWEEN A MANAGEMENT STATION AND AT LEAST TWO NETWORKS HAVING DUPLICATE INTERNET PROTOCOL ADDRESSES

BACKGROUND

Computer networks, such as Local Area Networks (LANs) and Metropolitan Area Networks (MANs) can be complex to operate. Corporations use network management software applications to maintain computer networks. The network management software applications can display the network topology and indicate any failures in the computer network. An example of a network management software application, is the Hewlett-Packard OpenView Network Node Manager (NNM) product.

Situations may occur in which it is necessary to manage networks which employ duplicate IP addresses. European Patent Application No. 1 251 657 A2 discloses a system and method for centrally managing private computer networks each of which has a network element assigned the identical IP address. This application discloses associating a separate virtual or physical interface at a management station with each domain. Accordingly, management data is exchanged between the management station and a particular domain through a domain-specific interface that is assigned its own IP address. This IP address is inserted as the source address in data transmitted from the management station, and is inserted as a destination address in data transmitted from a domain to the management station.

SUMMARY

A system and method are provided for communicating between a management station and at least two networks having duplicate Internet Protocol (IP) addresses. An IP address of an IP data packet to be sent to at least one of an end device and the management station is recognized. A header of the IP data packet is modified with a tag that identifies one of the duplicate IP networks within which the end device resides. In accordance with a policy, the IP data packet is routed based on the tag. An exemplary computer readable medium contains a computer program for causing a computing device to perform the exemplary method.

In accordance with an exemplary embodiment a management station which communicates with at least two networks having duplicate IP addresses is provided. The management station includes a processor which provides an IP address for an IP data packet to be sent to an end device. The processor determines whether the end device resides in one of the at least two networks and the processor modifies a header of the IP data packet with a tag that identifies one of the duplicate IP networks if the end device resides in one of the at least two networks. A management station also includes a transmitter which transmits the IP data packet.

In accordance with an exemplary embodiment a router which communicates with a management station and at least two networks having duplicate IP addresses is provided. The router includes a processor which determines whether a received IP data packet with a particular IP address was transmitted from an end device in one of the at least two networks or whether the received IP data packet was transmitted to an end device in one of the at least two networks. The processor modifies a header of the IP data packet with a tag that identifies one of the duplicate IP networks within which the end device resides if the received IP data packet was transmitted from the end device. The router also includes a transmitter which transmits the received IP data packet according to a particular IP address. If the IP data packet was transmitted to the end device, the transmission is also based on a tag that identifies one of the duplicate IP networks within which the end device resides.

A method for a management station which communicates with at least two networks having duplicate Internet Protocol (IP) addresses is provided. An IP address for an IP data packet to be sent to an end device is provided. Whether the end device resides in one of the at least two networks is determined. A header of the IP data packet is modified with a tag that identifies one of the duplicate IP networks when the end device resides in one of the at least two networks. The IP data packet is transmitted. An exemplary computer readable medium contains a computer program for causing a computing device to perform the exemplary method.

A management station which communicates with at least two networks having duplicate Internet Protocol (IP) addresses is provided. The management station comprises means for processing to provide an IP address for an IP data packet to be sent to an end device, to determine whether the end device resides in one of the at least two networks, and to modify a header of the IP data packet with a tag that identifies one of the duplicate IP networks when the end device resides in one of the at least two networks. The management station also comprises means for transmitting the IP data packet.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements and.

DETAILED DESCRIPTION

Figure 1:
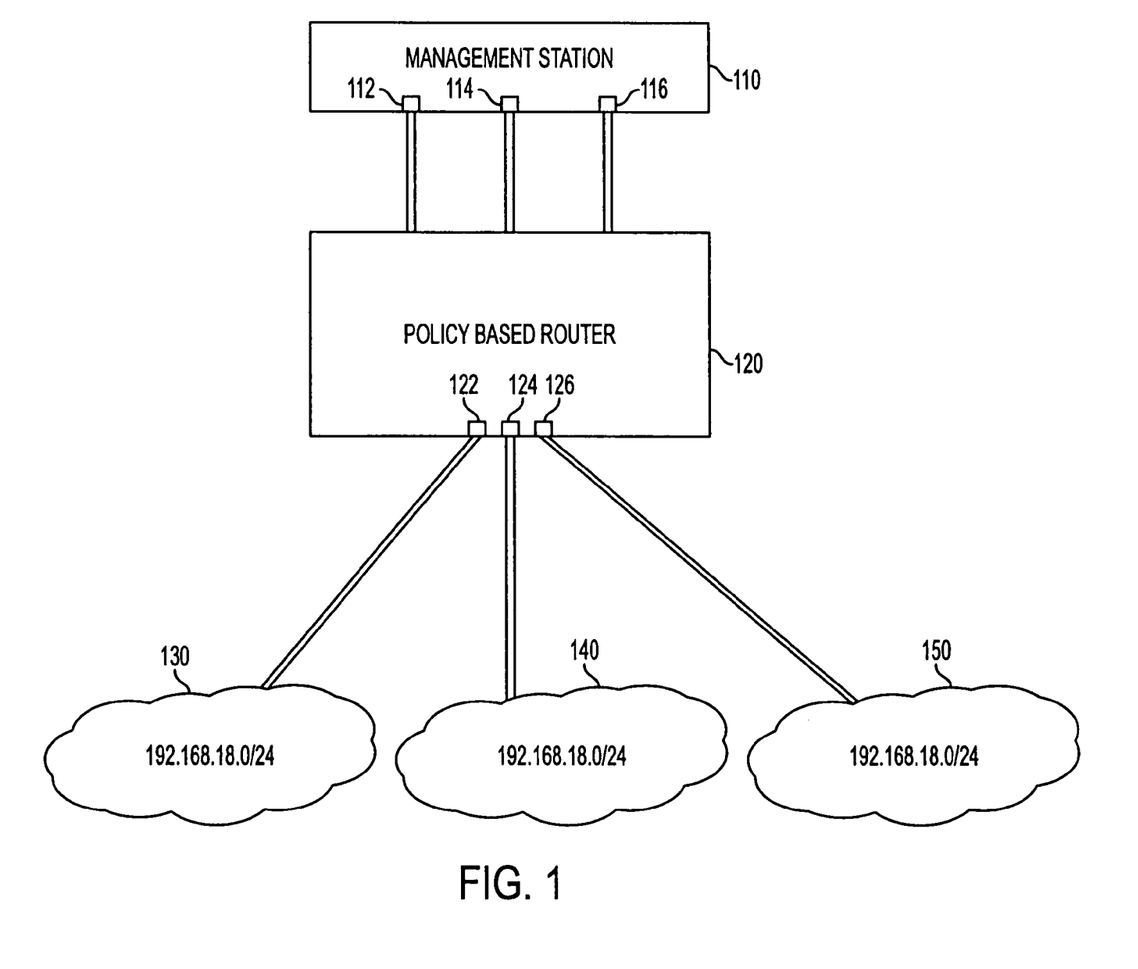
FIG. 1 is a diagram of an exemplary system including a management station, a router and duplicate IP networks.

FIG. 1 is a diagram illustrating a system with a management station 110 which is connected to a router 120, for example, a policy based router, via interfaces 112, 114 and 116. Router 120 is connected to network 130 via interface 122, to network 140 via interface 124, and to network 150 via interface 126. Interfaces 112, 114, 116, 122, 124 and 126 can be virtual interfaces, physical interfaces, or a combination thereof. Networks 130, 140 and 150 each have the same IP address of, for example, 192.168.18.0/24.

Figure 2A:
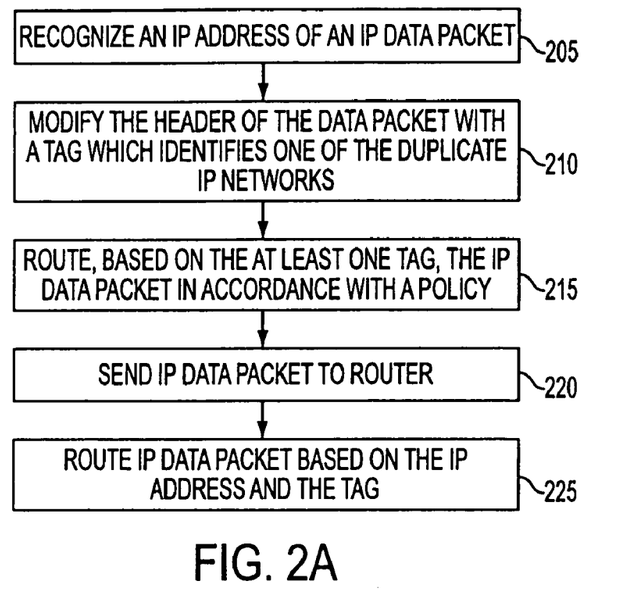
FIG. 2A is a flowchart illustrating an exemplary method for routing data packets from a management station to an end device in at least one of two networks with duplicate IP addresses.

FIG. 2A is a flowchart illustrating a method for routing data packets from management station 110 to an end device located in one of the networks 130, 140 or 150 with duplicate IP addresses. In step 205 an IP address for an IP data packet is recognized by management station 110 as being for an end device in one of networks 130, 140 or 150. In step 210, the management station 110 modifies the header of the data packet with a tag which identifies one of the duplicate IP networks within which the end device resides. The following is an exemplary IP data packet header:

| 0 | 4 | 8 | | 16 | 19 | 31 |
|---|---|---|---|---|---|---|
| Version | IHL | Type of Service | | Total Length | | |
| Identification | | | Flags | Fragment Offset | | |
| Time To Live | | Protocol | | Header Checksum | | |
| Source IP Address | | | | | | |
| Destination IP Address | | | | | | |
| Options | | | | | Padding | |

In accordance with exemplary embodiments the Type of Service field in the IP data packet header (i.e., bits 8-15 ) is used for the tag which identifies one of the duplicate IP networks. Specifically, the first six bits of the Type of Service field are used for the tag. The first six bits of the Type of Service field is typically employed for Differentiated Services Code Point (DSCP) for Quality of Service (QoS) in IP networks.

Referring again to FIGS. 1 and 2A, in steps 215, based on the tag, the management station 110 routes the IP data packet to one of the interfaces 112, 114 or 116 in accordance with a policy. In step 220 the management station 110 sends the IP data packet to the router 120. In step 225 the router routes the IP data packet based on the IP address and the tag.

Figure 2B:
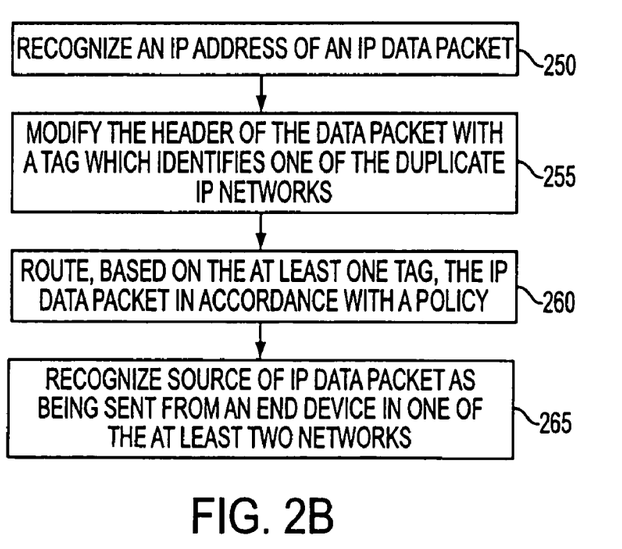
FIG. 2B is a flowchart illustrating an exemplary method for routing packets received from an end device in at least one of two networks having duplicate IP addresses to a management station.

FIG. 2B is a flowchart of a method for routing IP data packets received from an end device in at least one of two duplicate IP networks to a management station. In step 250 an IP data packet is received by the router 120 which recognizes an IP address of the IP data packet. In step 255 the router modifies the header of the data packet with a tag which identifies one of the duplicate IP networks based on the interface from which it received the packet. In step 260 the router 120, based on the tag, routes the IP data packet. In step 265 the management station 110 recognizes the source of the IP data packet as being sent from an end device in one of the at least two networks based on the IP address and the tag.

Figure 3:
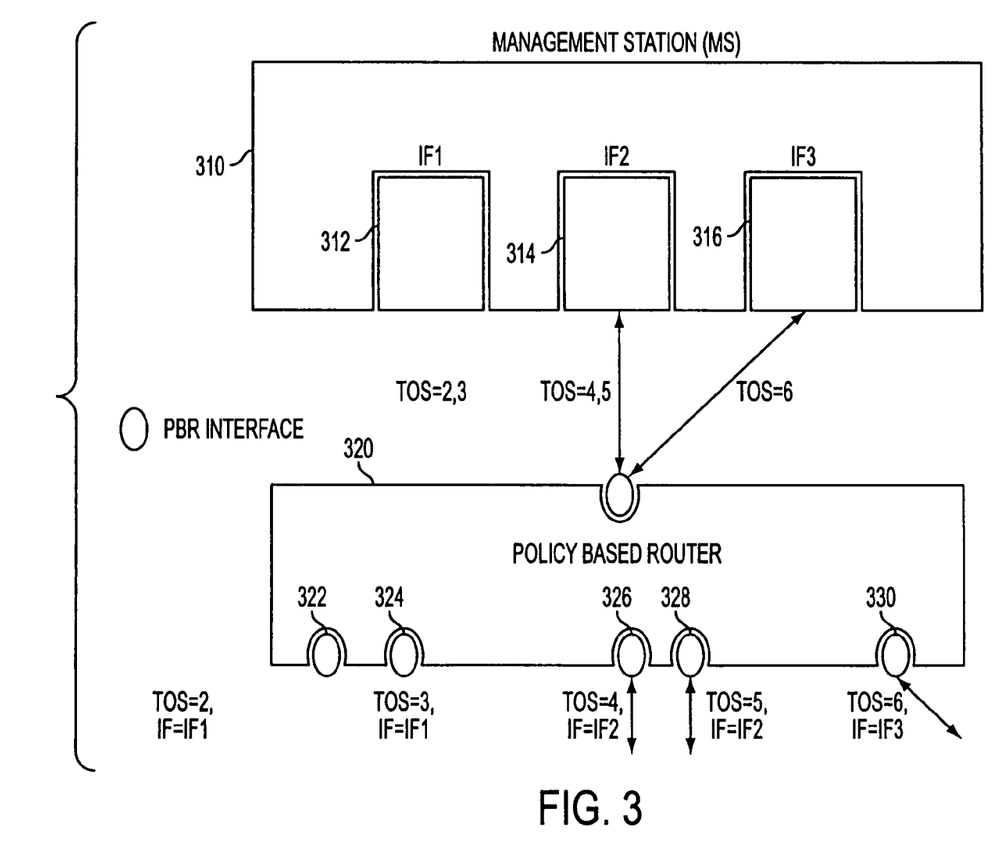
FIG. 3 is a diagram of an exemplary management station and router.

FIG. 3 is a diagram of an exemplary management station and router. As described above, six bits in the Type of Service field of the IP data packet header are employed for identifying a particular one of the networks with duplicate IP addresses. This allows a management station to manage up to sixty-three networks with identical IP addresses. In FIG. 3 management station 310 includes interfaces 312, 314 and 316. Interfaces 312, 314 and 316 can be physical interfaces, virtual interfaces, or a combination thereof. Accordingly, management station 310 can support sixty-three networks with identical IP addresses on each interface.

The router 320 includes interfaces 322, 324, 326, 328 and 330. Interfaces 322, 324, 326, 328 and 330 can be virtual interfaces, physical interfaces, or a combination thereof. The router 320 receives IP data packets and recognizes an IP address in the IP data packet as being associated with an end device in one of two or more from networks with duplicate IP addresses. The router 320 will modify the tag in the header of the IP data packet with the appropriate Type of Service value based on the interface on which the router received the IP data packet. The router 320 can then route the modified IP data packet to the appropriate interface on the management station 310. When the management station 310 sends packets to end devices in networks with duplicate IP addresses, the router 320 routes the packets to the appropriate network based upon the interface of the management station from which the IP data packet was received by the router 320 and the tag in the Type of Service field.

The following is exemplary pseudo code for communication from a management station to a device located in one of at least two networks with identical IP addresses:

```
For Management Station
    Get the Management IP interface and TOS/DSCP value
        to use for the given IP address and Route
        Distinguisher (RD) {RD is used with IP address
        to uniquely identify address of destination
    Create a packet with the appropriate TOS/DSCP
        value set in it {the packet will have the
        source IP as the management IP address and
        the destination as the IP address of the
        device
    Send the packet out.
    }
```

The following is exemplary pseudo code for communication from a device located in one of at least two networks with identical IP addresses to a management station:

```
For policy router
    receive the packet on its appropriate
        interface
    look up its configuration to get the TOS/DSCP
        value for any packet that is incoming on
        the interface
    set the TOS/DSCP value on the packet
    send it to the management station
    }
For the management station
    receive the packet
    look at the TOS/DSCP, the destination address
        on the received packet to determine the
        RD from which the communication was
        sent
    }
```

Since the end device will send the address of management station interface as the destination address, hence the need to look up by the destination address.

To enable policy based routing an access control list is created. The access control list specifies the traffic that match from the management station to the networks with duplicate IP addresses. The access control list is created as follows:

ip access-list extended cust-1 permit ip host 15.2.113.10 any dscp 10 ip access-list extended cust-2 permit ip host 15.2.113.10 any dscp 20 ip access-list extended to-mgmt-stn permit ip any host 15.2.113.10

Next a route map that forwards based on the value in the type of service field is created as follows:

ip route-map DSCP-ROUTE permit 1 match ip address cust-1 set interface Serial0.1 ip route-map DSCP-ROUTE permit 2 match ip address cust-2 set interface Serial0.2

When there are more than two networks with duplicate IP addresses, new access control lists are created for each of the networks and the route map for forwarding traffic based upon the networks is enhanced.

To allow packets destined for networks to be forwarded through the correct interface on the router, the policy is installed on the FastEthernet0 Interface in accordance with the following:

interface FastEthernet0
    ip policy route-map DSCP-ROUTE Class-maps for traffic from the networks with duplicate IP addresses to the management station are created as follows:

class-map from-cust-1 match-all match input-interface Serial0.1 match access-group to-mgmt-stn
    class-map from-cust-2 match-all match input-interface Serial0.2 match access-group to-mgmt-stn Traffic marking policies based on the class-map are defined as follows:

policy-map CUST-DSCP class from-cust-1 set ip dscp 10
    policy-map CUST-DSCP class from-cust-2 set ip dscp 20

To apply the quality of service policy to the interface FastEthernet0 the policy is applied as follows:

interface FastEthernet0
    service-policy output CUST-DSCP The access control lists, route maps, class-maps and policies can be provided to routers from the management station if control of network devices is enabled in the management software.

Figure 4:
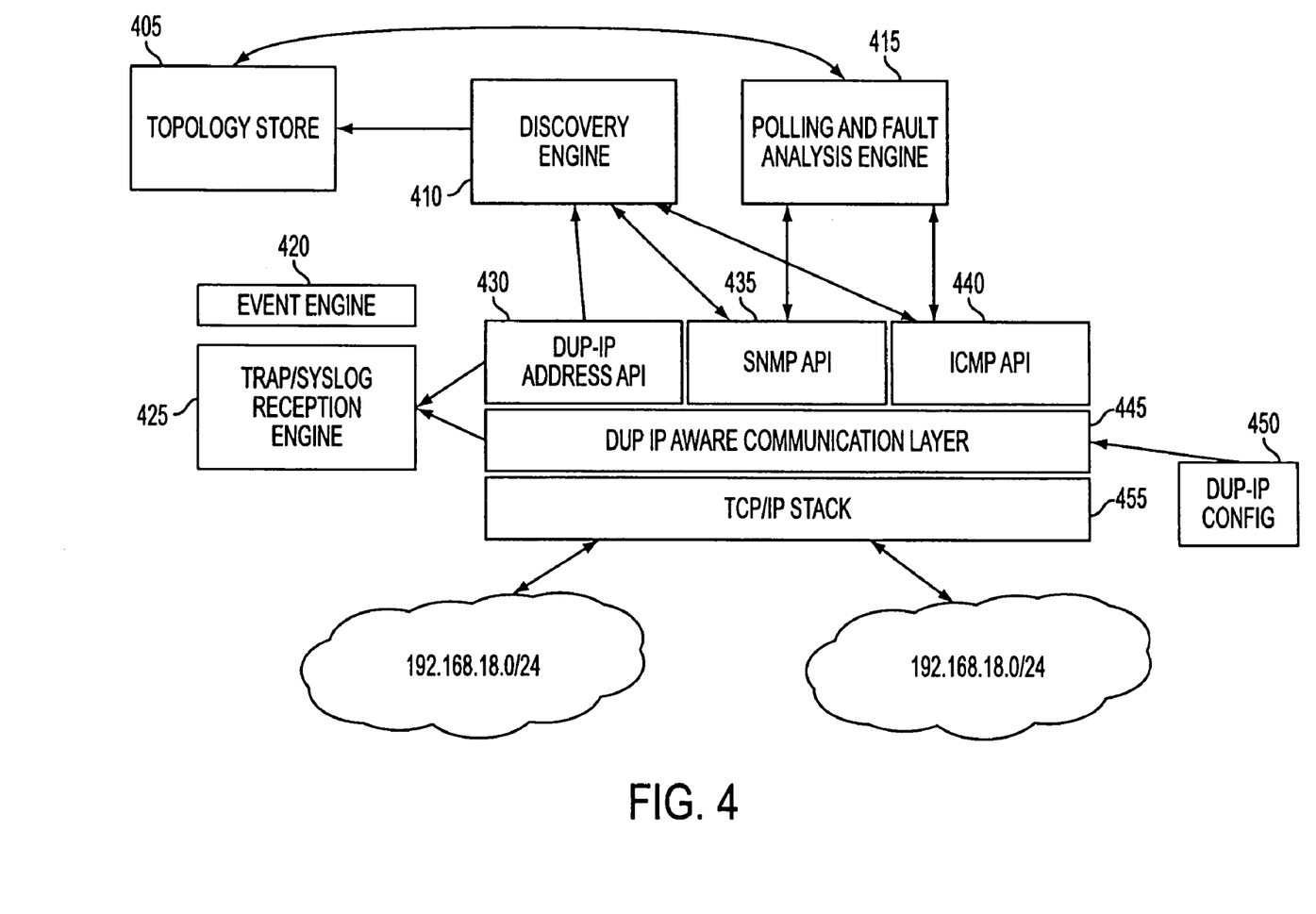
FIG. 4 is a diagram of a high level logical architecture of an exemplary management station.

FIG. 4 is a diagram of a high level logical architecture of an exemplary management station. The logical architecture of the management station includes topology store 405 which stores the topology of the networks managed by the management station. Discovery engine 410 manages the discovery of various elements within the networks managed by the management station. Polling and fault analysis engine 415 is employed for polling the networks to discover the topology of the network and identify faults in the networks. Event engine 420 and trap/syslog reception engine 425 monitor messages received from the networks. The logical architecture of the management station also includes a duplicate IP address Application Programming Interface (API), an Simple Network Management Protocol (SNMP) API, and an Internet Control Message Protocol (ICMP) API. The management station also includes duplicate IP-aware communication layer 445 duplicate IP configuration layer 450, and TCP/IP stack 455. The duplicate IP address API 430, duplicate IP-aware communication layer 445, and duplicate IP configuration layer 450 are the logical elements in the management station which allow for the management station to communicate with duplicate IP networks.

Various aspects will now be described in connection with exemplary embodiments in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both. Moreover, the exemplary embodiments can be considered part of any form of computer readable storage medium having stored therein an appropriate set of computer instructions that would cause a processor to carry out the techniques described herein.

Figure 5:
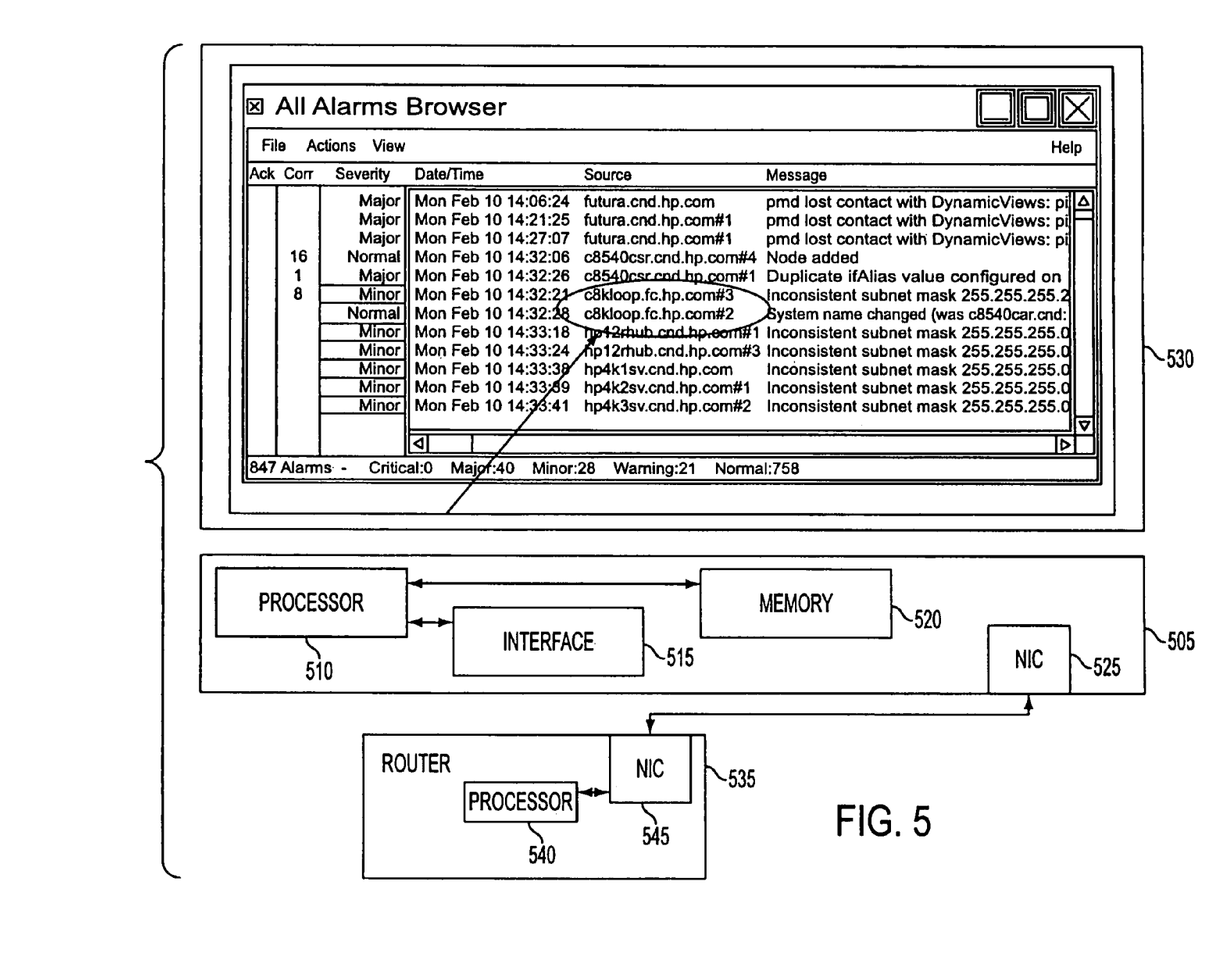
FIG. 5 is a diagram of an exemplary computer implementation and router.

FIG. 5 illustrates an exemplary computer implementation and network. The computer implementation can include a management computer 505 which comprises a means for processing, for example a processor 510. The management computer also comprises an interface 515, memory 520, and means for transmitting, for example a network interface card 525. The management computer can also include a display 530. The processor 510 is configured to provide an IP address for an IP data packet to be sent to an end device. The processor is also configured to determine whether the end device resides in one of the at least two networks. The processor is further configured to modify a header of the IP data packet with a tag that identifies one of the duplicate IP networks when the end device resides in one of the at least two networks. A transmitter, for example network interface card 525, is configured to transmit the IP data packet.

The router 535 includes a means for processing, for example a processor 540 and a means for transmitting, for example a network interface card 545. Processor 540 is configured to determine whether a received IP data packet with a particular IP address was transmitted from an end device in one of the at least two networks, or whether the received IP data packet is transmitted to an end device in one of the at least two networks. Processor 540 is also configured to modify a header of the IP data packet with a tag that identifies one of the duplicate IP networks within which the end device resides when the received IP data packet was transmitted from the end device. The router also includes a transmitter, for example network interface card 545, which transmits the received IP data packet according to a particular IP address. When the IP data packet is transmitted to the end device, the transmitter 545 is configured to base the transmission on a tag that identifies one of the duplicate IP networks within which the end device resides.

Those skilled in the art will appreciate that software, including instructions for causing a computing device or system to perform the methods or processes described herein, can be stored on a machine-readable medium. For example, the software can be embodied in any computer readable medium for use by or in connection with an instruction execution system, apparatus, or device, such as a computer based system, processor containing system, or other system that can fetch the instructions from the instruction execution system, apparatus, or device and execute the instructions.

As used herein, a "computer readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non exhaustive list) of the computer readable medium can include the following: an electrical connection having one or more wires, a portable computer diskette, a random access memory (RAM), a read only memory (ROM), an erasable programmable read only memory (EPROM or Flash memory), an optical fiber, and a portable compact disc read only memory (CDROM).

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A method for communicating between a management station and at least two networks having duplicate Internet Protocol (IP) addresses comprising:

recognizing an IP address of an IP data packet to be sent to at least one of an end device and the management station;

modifying a header of the IP data packet with a tag that identifies one of the duplicate IP networks within which the end device resides;

routing, based on the tag, the IP data packet in accordance with a policy.

2. The method of claim 1, wherein the management station modifies the header.

3. The method of claim 2, comprising:
sending the IP data packet to a router;
routing the IP data packet, based on the IP address and the tag, to one of the at least two networks.

4. The method of claim 1, wherein a router modifies the header.

5. The method of claim 4, comprising:
sending the IP data packet to the management station; and
recognizing a source of the IP data packet as being sent from the end device in one of the at least two networks based upon the IP address and the tag.

6. The method of claim 1, wherein the tag is placed in a type of service field in the header.

7. A management station which communicates with at least two networks having duplicate Internet Protocol (IP) addresses, the management station comprising:
a processor which provides an IP address for an IP data packet to be sent to an end device, which determines whether the end device resides in one of the at least two networks, and which modifies a header of the IP data packet with a tag that identifies one of the duplicate IP networks when the end device resides in one of the at least two networks; and
a transmitter which transmits the IP data packet, said IP data packet being routed, based on the tag, in accordance with a policy.

8. The management station of claim 7, wherein the tag is placed in a type of service field of the header of the IP data packet.

9. The management station of claim 7, wherein the processor determines whether a data packet was sent from a particular one of the at least two networks based on a tag and an IP source address in a received data packet.

10. A router which communicates with a management station and at least two networks having duplicate Internet Protocol (IP) addresses, the router comprising:
a processor which determines whether a received IP data packet with a particular IP address was transmitted from an end device in one of the at least two networks or whether the received IP data packet was transmitted to an end device in one of the at least two networks, and which modifies a header of the IP data packet with a tag that identifies one of the duplicate IP networks within which the end device resides when the received IP data packet was transmitted from the end device; and
a transmitter which transmits the received IP data packet according to a particular IP address, and when the IP data packet was transmitted to the end device, the transmission is also based on the tag, in accordance with a policy.

11. The router of claim 10, wherein the tag is placed in a type of service field of the header of the IP data packet.

12. A computer readable medium containing a computer program for communicating between a management station and at least two networks having duplicate Internet Protocol addresses, said program, when executed by a processor, controlling the processor to perform a method comprising:

recognizing an IP address of an IP data packet to be sent to at least one of an end device and the management station;

modifying a header of the IP data packet with a tag that identifies one of the duplicate IP networks within which the end device resides;

routing, based on the tag, the IP data packet in accordance with a policy.

13. The method of claim 12, wherein the management station modifies the header.

14. The method of claim 13, comprising:
sending the IP data packet to a router;
routing the IP data packet based on the IP address and the tag, to one of the at least two networks.

15. The method of claim 12, wherein a router modifies the header.

16. The method of claim 15, comprising:
sending the IP data packet to the management station; and
recognizing a source of the IP data packet as being sent from the end device in one of the at least two networks based upon the IP address and the tag.

17. The method of claim 12, wherein the tag is placed in a type of service field in the header.

18. A method for a management station which communicates with at least two networks having duplicate Internet Protocol (IP) addresses, the method comprising:
providing an IP address for an IP data packet to be sent to an end device;
determining whether the end device resides in one of the at least two networks;
modifying a header of the IP data packet with a tag that identifies one of the duplicate IP networks when the end device resides in one of the at least two networks; and
transmitting the IP data packet, said IP data packet being routed, based on the tag, in accordance with a policy.

19. The method of claim 18, wherein the tag is placed in a type of service field of the header of the IP data packet.

20. The method of claim 18, wherein the determination of whether a data packet was sent from a particular one of the at least two networks is based on a tag and an IP source address in a received data packet.

21. A method for a router which communicates with a management station and at least two networks having duplicate Internet Protocol (IP) addresses, the router comprising:
determining whether a received IP data packet with a particular IP address was transmitted from an end device in one of the at least two networks;
determining whether the received IP data packet was transmitted to an end device in one of the at least two networks;
modifying a header of the IP data packet with a tag that identifies one of the duplicate IP networks within which the end device resides when the received IP data packet was transmitted from the end device; and
transmitting the received IP data packet according to a particular IP address, and when the IP data packet was transmitted to the end device the transmission is also based on the tag, in accordance with a policy.

22. The method of claim 21, wherein the tag is placed in a type of service field of the header of the IP data packet.

23. A computer readable medium containing a computer program for a management station which communicates with at least two networks having duplicate Internet Protocol (IP) addresses, said program, when executed by a processor, controlling the management station to perform a method comprising:

providing an IP address for an IP data packet to be sent to an end device;

determining whether the end device resides in one of the at least two networks;

modifying a header of the IP data packet with a tag that identifies one of the duplicate IP networks when the end device resides in one of the at least two networks; and transmitting the IP data packet, said IP data packet being routed, based on the tag, in accordance with a policy.

24. The method of claim 23, wherein the tag is placed in a type of service field of the header of the IP data packet.

25. The method of claim 23, wherein the determination of whether a data packet was sent from a particular one of the at least two networks is based on a tag and an IP source address in a received data packet.

26. A computer readable medium containing a computer program for a router which communicates with a management station and at least two networks having duplicate Internet Protocol (IP) addresses, said program, when executed by a processor, controlling the router to perform a method comprising:

determining whether a received IP data packet with a particular IP address was transmitted from an end device in one of the at least two networks;

determining whether the received IP data packet was transmitted to an end device in one of the at least two networks;

modifying a header of the IP data packet with a tag that identifies one of the duplicate IP networks within which the end device resides when the received IP data packet was transmitted from the end device; and transmitting the received IP data packet according to a particular IP address, and when the IP data packet was transmitted to the end device the transmission is also based on the tag, in accordance with a policy.

27. The router of claim 26, wherein the tag is placed in a type of service field of the header of the IP data packet.

28. A management station which communicates with at least two networks having duplicate Internet Protocol (IP) addresses comprising:

means for processing to provide an IP address for an IP data packet to be sent to an end device, to determine whether the end device resides in one of the at least two networks, and to modify a header of the IP data packet with a tag that identifies one of the duplicate IP networks when the end device resides in one of the at least two networks; and means for transmitting the IP data packet, said IP data packet being routed, based on the tag, in accordance with a policy.

29. The management station of claim 28, wherein the tag is placed in a type of service field of the header of the IP data packet.

30. The management station of claim 28, wherein the means for processing determines whether a data packet was sent from a particular one of the at least two networks based on a tag and an IP source address in a received data packet.

31. A router which communicates with a management station and at least two networks, said networks having duplicate Internet Protocol (IP) addresses, the router comprising:

means for processing to determine whether a received IP data packet with a particular IP address was transmitted from an end device in one of the at least two networks or whether the received IP data packet was transmitted to an end device in one of the at least two networks, and to modify a header of the IP data packet with a tag that identifies one of the duplicate IP networks within which the end device resides when the received IP data packet was transmitted from the end device; and means for transmitting the received IP data packet according to a particular IP address, and when the IP data packet was transmitted to the end device the transmission is also based on the tag, in accordance with a policy.

32. The router of claim 31, wherein the tag is placed in a type of service field of the header of the IP data packet.

* * * * *